United States Patent [19]

Nagano

[11] 4,132,977

[45] Jan. 2, 1979

[54] IMAGE INFORMATION READING APPARATUS

[75] Inventor: Humikazu Nagano, Nara, Japan

[73] Assignee: Sharp Kabushiki Kaisha, Osaka, Japan

[21] Appl. No.: 817,620

[22] Filed: Jul. 21, 1977

[30] Foreign Application Priority Data

Jul. 23, 1976 [JP] Japan .................................. 51-88570

[51] Int. Cl.² .............................................. G06K 9/00
[52] U.S. Cl. ........................... 340/146.3 AG; 307/360
[58] Field of Search .......... 340/146.3 AG, 146.3 MA, 340/146.3 H; 358/282, 284; 307/231, 350, 241, 352, 360

[56] References Cited

U.S. PATENT DOCUMENTS

| 3,582,887 | 6/1971 | Guthrie ...................... 340/146.3 AG |
| 3,668,637 | 6/1972 | Sakai et al. ................. 340/146.3 AG |
| 3,688,266 | 8/1972 | Watanabe et al. ......... 340/146.3 MA |
| 3,973,239 | 8/1976 | Kakumoto et al. ........ 340/146.3 MA |
| 4,003,024 | 1/1977 | Riganati et al. ........... 340/146.3 MA |

Primary Examiner—Leo H. Boudreau
Attorney, Agent, or Firm—Staas & Halsey

[57] ABSTRACT

An image information reading apparatus, wherein another comparator having a deep slice level is provided apart from a usual comparator having an ordinary slice level, and determination is made continuously as to whether a white portion of a small area is included in the black background being scanned and either of the said two comparators is enabled as a function of the determination, whereby a clear reproduced image is obtained with ease.

9 Claims, 5 Drawing Figures

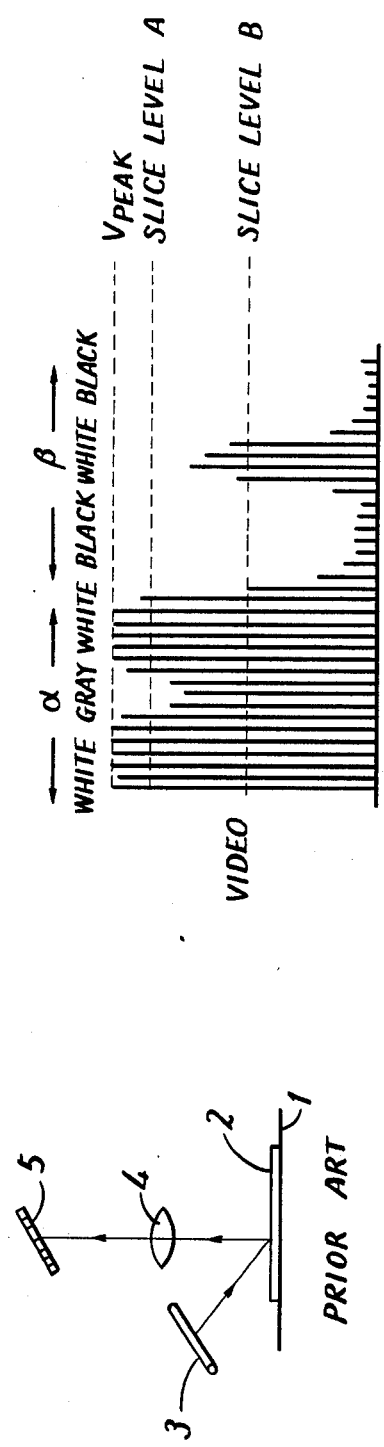
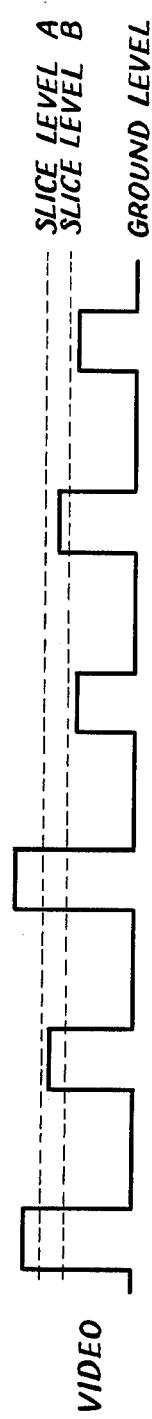
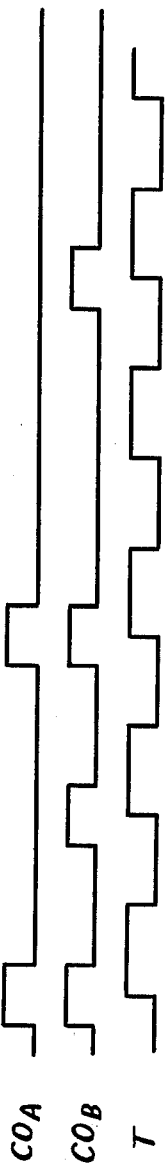
FIG. 1 PRIOR ART
FIG. 2
FIG. 3

IMAGE INFORMATION READING APPARATUS

BACKGROUND OF THE INVENTION

1. Field of the Invention

The present invention relates to an apparatus for reading image information. More specifically, the present invention relates to an improvement in level detection of an image information signal.

2. Description of the Prior Art

A typical conventional scheme for reading image information on a card such as a paper sheet for a facsimile apparatus is structured such that the optical density of the image information is converted into an electrical analog signal by means of a photoelectric converter and the electrical analog signal is level detected at a predetermined slide level by means of a comparator, for example, whereby an image information signal of bivalued digital form is obtained wherein the image information is represented by either a logical "one" and "zero", with the logical "one" corresponding to the white and the logical "zero" corresponding to the black.

FIG. 1 shows a schematic diagram of a reading/scanning station of a facsimile apparatus, for example, wherein the image on a card 2 for the facsimile placed on a paper feed apparatus 1 is illuminated by the light beam from a light source 3 and the light beam reflecting therefrom is focused on an image sensor 5 by means of a lens 4, whereby image information on the card 2 is converted into an electrical analog signal.

FIG. 2 shows a graph of the electrical analog signal thus obtained of the image pattern from the card by means of the photoelectric sensor 5 shown in FIG. 1,, wherein the analog signal has been represented such that the white is the high level and the black is the low level. Referring to FIG. 2, a region $\alpha$ shows a case where the background is the white and the gray partly exists in the background, whereas a region $\beta$ shows a case where the backgrond is the black in which a dot like white pattern of a very small area exists.

A typical conventional image reading apparatus comprises a comparator adapted for level detecting the input signal at a predetermined slice level A for discrimination of the black and white, which slice level A is selected as shown in FIG. 2 with respect to a peak level $V_{PEAK}$. However, in the conventional apparatus, the slice level A was selected to be rather close to the peak level $V_{PEAK}$, i.e. in a shallow slice level. Therefore, a disadvantage was encountered in that although discrimination can be made between the white and the gray as in the case of the $\alpha$ region, such discrimination becomes impossible for the comparator having the slice level A in case of the $\beta$ region because of the low white level at the center, with the result that the $\beta$ region is judged entirely as a black area.

The above described disadvantage is caused by insufficient resolution of the lens in view of the fact that there is a limit to the resolution of the lens 4 shown in FIG. 1. Therefore, in case where the background is white and light, the light beam reflected from the background impinges on the black portion of a small area, and in case where the background is black and dark, a portion of the light beam impinging on the white portion of a small area surrounded by the black background is absorbed by the surrounding background.

The problem of insufficient resolution of the lens could be solved to some extent by using a lens having a high resolution. However, normally a lens having a high resolution is very expensive. Thus, it is difficult to provide an image information reading apparatus that is inexpensive.

SUMMARY OF THE INVENTION

According to the present invention, another comparator having a deep slice level is provided apart from a usual comparator having a shallow slice level, and gates are provided that are responsive to the output signals from the respective comparators such that the conduction state thereof is controlled such that the normal comparator having the shallow slice level is enabled if and when the image information being read is of a proper mixture of white and black whereas the other comparator of the deep slice level is enabled if and when the white portions of a small area are dotted in the black background. As a result, an inexpensive image information reading apparatus is provided that can discriminate between the black and white with high fidelity.

Therefore, a principal object of the present invention is to provide an improved image information reading apparatus that can provide a clear reproduced image with ease.

Another object of the present invention is to provide an inexpensive image information reading apparatus for reading an image with high fidelity without using an expensive lens of high resolution.

These objects, and other objects, features, aspects and advantages of the present invention will become more apparent from the following detailed description of the present invention when taken in conjunction with the accompanying drawings.

BRIEF DESCRIPTION OF THE DRAWINGS

FIG. 1 shows a schematic diagram of an image reading apparatus of a facsimile or the like;

FIG. 2 is a graph showing an analog signal of image information;

FIG. 3 is a graph showing the wave forms of the outputs from the comparators;

DESCRIPTION OF THE PREFERRED EMBODIMENTS

Figure 4:
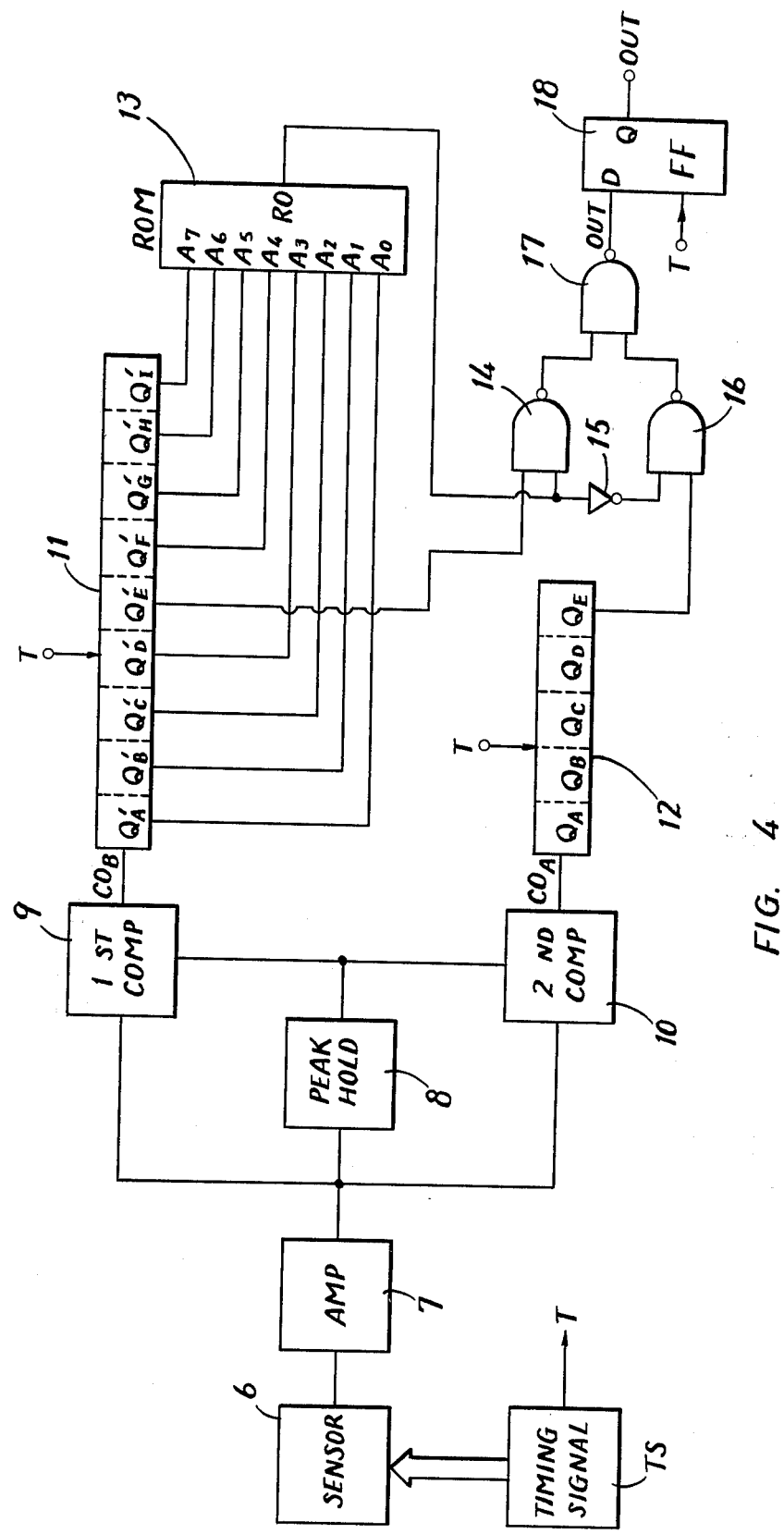
FIG. 4 shows a block diagram of one embodiment of the present invention.

FIG. 4 shows a block diagram of an image information reading apparatus of one embodiment of the present invention. Referring to FIG. 4, the image information on the card is converted into an electrical analog signal by means of a photoelectric sensor 6 and the analog signal is amplified by an amplifier 7 and is applied to a peak hold circuit 8, a first comparator 9 having a deep slice level B and a second comparator 10 having a usual shallow slice level A. The output of the peak hold circuit 8 is applied to the first and second comparators 9 and 10.

The output $CO_B$ of the first comparator 9 is applied to a 9-bit shift register 11. The bit parallel output terminals $Q'A, Q'B, \ldots, Q'I$ are in parallel coupled to the input terminals $A_0, A_1, \ldots A_7$ of a read only memory 13. The output RO of the read only memory 13 is coupled to one input of a NAND gate 14 and through an invertor 15 to one input of a NAND gate 16. The output of only the fifth bit output terminal $Q'E$ that is the center of nine bits is applied to the other input of the NAND gate 14.

The output $CO_A$ of the second comparator 10 is applied to a 5-bit shift register 12 and the output terminal QE out of the parallel output terminals QA, QB, ... QE of the shift register 12 is applied to the other input terminal of the NAND gate 16. The ouputs from the NAND gates 14 and 16 are applied to the inputs to a NAND gate 17. The output from the NAND gate 17 is applied to the D terminal of a D type flip-flop 18. The output terminal Q of the flip-flop 18 is utilized to withdraw the image information output. The shift registers 11 and 12 are structured to be operative responsive to a timing signal T. Similarly, the flip-flop 18 is structured to be operative responsive to the timing signal T. For the purpose of providing a train of timing signals T, a timing signal generator TS is provided operatively coupled to the sensor 6. A timing relation between the output VIDEO from the sensor 6 and the timing signal T is seen in FIG. 3, to be described subsequently.

Now the operation of the FIG. 4 embodiment will be described in the following. A paper sheet carrying image information thereon is subjected to the light beam and the light beam reflected therefrom including the image information is converted into an analog signal by means of the photoelectric sensor 6. The analog signal is amplified by means of the amplifier 7 up to the level sufficient enough to drive the comparators. The peak hold circuit 8 comprises a circuit for holding a positive going peak that is adapted to detect a signal corresponding to the background of the paper sheet, normally white. Thus, in such a situation, the white is represented by the high level or a logic one while the black is represented by the low level or a logic zero, as shown in the example of the color pattern shown in FIG. 2. The comparators 9 and 10 are structured to have different predetermined slice levels B and A, respectively, which are differently level set with respect to the level of the background white of the paper sheet which is denoted as $V_{PEAK}$. In consideration of the resolution of the optical system, the slice level A is usually set to the 70 percent value with respect to the peak value $V_{PEAK}$, while the slice level B is selected to be the value of about 60 percent with respect to the peak value $V_{PEAK}$, and normally the value of the slice level B is selected to be smaller than the value of the slice level A. Since the value of the slice level B of the comparator 9 is set deeper than the value of the slice level A of the comparator 10, the white portion in the $\beta$ region in the example of the color pattern shown in FIG. 2 can be detected as a white area without any error.

FIG. 3 shows a timing relation of the outputs $CO_A$ and $CO_B$ of the comparators 10 and 9 obtained in response to the video information signal corresponding to the color pattern examples $\alpha$ and $\beta$ shown in FIG. 2 with the clock signal T which is utilized as a synchronizing signal of the image information reading apparatus shown in FIG. 4. The output $CO_B$ of the comparator 9 is transferred to the 9-bit shift register 11 having a bit parallel output and the output $CO_A$ of the comparator 10 is transferred to the 5-bit shift register 12 having a bit parallel output, both in synchronism with the rise edge of the clock pulse T. The fifth bit output QE of the 5-bit shift register 12 is applied to one input to the NAND gate 16 and the fifth bit output Q'E of the central bit position of the 9-bit shift register 11 is applied to one input of the NAND gate 14. The remaining eight bit outputs Q'A, Q'B, ... Q'I of the shift register 11 are applied in parallel to the parallel inputs $A_0, A_1, \ldots A_7$ of the read only memory 13.

The read only memory 13 makes determination as to whether the image information being presently scanned includes a white portion of a small area in the black background in the light of the pattern of the digital signal stored in the four forward bit positions Q'A, Q'B, Q'C and Q'D and the four backward bit positions Q'F, Q'G, Q'H and Q'I with respect to the fifth bit position Q'E of the shift register 11. To that end the read only memory 10 is preset such that the same provides a logic one level output from the output terminal RO if and when the determination is "YES" and provides a logic zero output from the output terminal RO if and when the determination is "NO."

One example of the information being preset in the read only memory 13 is shown in Table 1, wherein the data has been preloaded such that a logic one or a logic zero is obtained from the output terminal RO of the read only memory 13 depending on the logic state pattern stored in the four forward bit positions and the four backward bit positions with respect to the central position Q'E. The output RO of the read only memory 13 is coupled to the other input of the NAND gate 14 and through the invertor 15 to the other input to the NAND gate 16. If and when a white portion of a small area is included in the black background, the output RO of the read only memory 13 becomes a logic one and the output from the bit position Q'E which was obtained from the comparator 9 having the deep slice level B becomes a logic one. Therefore, the output of the NAND gate 14 becomes a logic zero. On the other hand, the output from the bit position QE of the shift register 12 which was obtained from the comparator 10 having the normal shallow slice level A becomes a logic zero. Since both inputs to the NAND gate 16 become logic zeros, a logic one output is obtained therefrom. Therefore, no output is obtained from the NAND gate 17. Accordingly, in the foregoing case, determination of the black and white is made based on the deep slice level B. As a result, the image information can be read with high fidelity.

On the other hand, if and when the black and white have been distributed in an ordinary manner or a black portion of a small area exists in the white background, the output RO of the read only memory 13 becomes a logic zero. Therefore, regardless of whether the output from the bit position Q'E obtained from the comparator 9 having the deep slice level B had been a logic one or a logic zero, the output from the NAND gate 14 becomes a logic one and accordingly the output from the NAND gate 17 becomes a logic zero. Therefore, the output from the bit position Q'E of the shift register 11 is not adopted, but instead the output from the bit position QE of the shift register 12 obtained from the comparator 10 having the ordinary shallow slice level A appears as a logic one at the output from the NAND gate 17.

The output from the NAND gate 17 is applied to the terminal D of the D type flip-flop 18 and is latched in synchronism with the rise of the clock pulse T and the output is obtained from the output terminal Q of the flip-flop 18.

Figure 5:
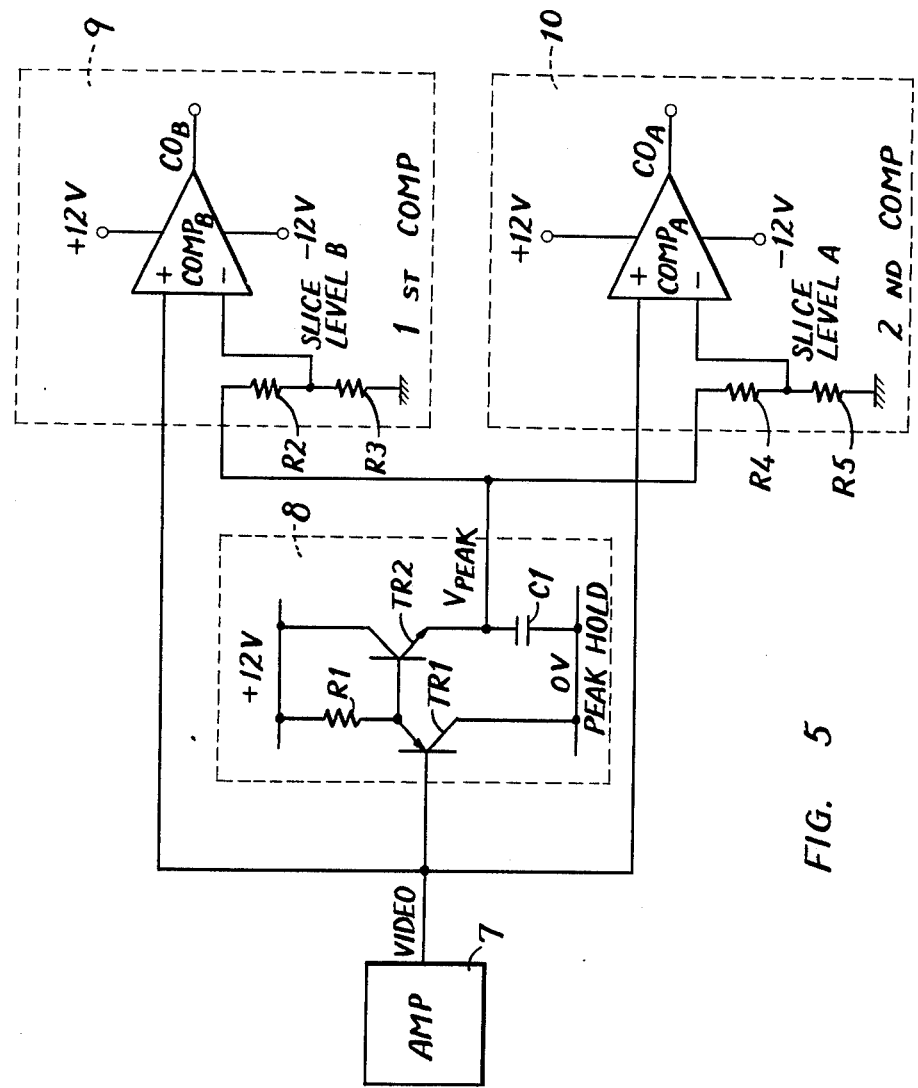
FIG. 5 shows a schematic diagram of only the peak hold circuit 8, the first and second comparators 9 and 10 in FIG. 4.

FIG. 5 shows a schematic diagram of only the peak hold circuit 8, and first and second comparators 9 and 10 shown in FIG. 4. The output VIDEO from the amplifier 7 is applied to the base electrode of a PNP transistor constituting an input circuit of the peak hold circuit 8 and is also applied to the + input of the first comparator COMPB having the deep slice level B and to the + input of the second comparator COMPA having the shallow slice level A. The transistor is configured as an emitter follower, so that the emitter potential of the transistor TR1 is higher by the base emitter forward drop than the VIDEO output. The emitter electrode of the transistor TR1 is connected to the base electrode of an NPN transistor TR2 in the subsequent stage. The collector of the transistor TR2 is connected to the positive power supply +12V, and the emitter of the transistor TR2 is grounded through a capacitor C1 and is also connected to provide the signal $V_{PEAK}$. It is appreciated that the emitter potential of the transistor TR2, i.e. the level of the signal $V_{PEAK}$ is lower by the base emitter forward drop $V_{BE}$ than the base potential of transistor TR2. Accordingly, if and when the following relation is selected $C1 \cdot (R_2 + R_3) >>$ the scanning cycle period of the photoelectric sensor, and $C1 \cdot (R_4 + R_5) >>$ the scanning cycle period of the photoelectric sensor where $R_2$, $R_3$, $R_4$ and $R_5$ are to be described subsequently, then the level $V_{PEAK}$ comes to settle down to the value in the vicinity of the maximum value. The level $V_{PEAK}$ is applied to the potentiometer implemented by the resisters $R_2$ and $R_3$ for the first comparator 9 and to the potentiometer implemented by the resistors $R_4$ and $R_5$ for the second comparator 10.

If $R_3/(R_2 + R_3) = 0.6$ is selected, then the slice level $B = 0.6 \times V_{PEAK}$ is attained, and therefore the slice level B comes to be the level of the value as large as 60 percent of the level $V_{peak}$. The slice level B is applied to the minus input terminal of the comparator COMPB. Therefore, the output $CO_B$ from the comparator COMPB becomes as follows.

If VIDEO $> 0.6 \times V_{PEAK}$, then $CO_B = $ "1", and
if VIDEO $< 0.6 \times V_{PEAK}$, then $CO_B = $ "0"

if $R_5/(R_4 + R_5) = 0.7$ is selected, then the slice level $A = 0.7 \times V_{PEAK}$ is attained, and the slice level A comes to be the level of the value as large as 70 percent of the level $V_{PEAK}$. The slice level A is applied to the minus input terminal of the comparator COMPA. Therefore, the output $CO_A$ from the comparator COMPA becomes as follows;

if VIDEO $> 0.7 \times V_{PEAK}$, then $CO_A = $ "1", and
if VIDEO $< 0.7 \times V_{PEAK}$, then $CO_A = 0$ "0 ".

In the foregoing, the embodiment was described in which the 9-bit shift register and the 5-bit shift register were utilized, which were adopted as an example believed to operate effectively with a less number of bit positions for providing the signals obtained at the first and second slice levels. However, this should not be construed by way of limitation, inasmuch as various modifications and changes can be made without departing from the spirit and scope of the present invention.

TABLE I

| Q'A | Q'B | Q'C | Q'D | Q'E | Q'F | Q'G | Q'H | Q'I | |
|---|---|---|---|---|---|---|---|---|---|
| $A_0$ | $A_1$ | $A_2$ | $A_3$ | | $A_4$ | $A_5$ | $A_6$ | $A_7$ | RO |
| 0 | 0 | 0 | 1 | 1 | 0 | 0 | 0 | 0 | 1 |
| 1 | 0 | 0 | 1 | 1 | 0 | 0 | 0 | 0 | 1 |
| 0 | 1 | 0 | 1 | 1 | 0 | 0 | 0 | 0 | 1 |
| 1 | 1 | 0 | 1 | 1 | 0 | 0 | 0 | 0 | 1 |
| 0 | 0 | 0 | 0 | 1 | 1 | 0 | 0 | 0 | 1 |
| 1 | 0 | 0 | 0 | 1 | 1 | 0 | 0 | 0 | 1 |
| 0 | 1 | 0 | 0 | 1 | 1 | 0 | 0 | 0 | 1 |
| 1 | 1 | 0 | 0 | 1 | 1 | 0 | 0 | 0 | 1 |
| 0 | 0 | 0 | 1 | 1 | 0 | 0 | 1 | 0 | 1 |
| 1 | 0 | 0 | 1 | 1 | 0 | 0 | 1 | 0 | 1 |
| 0 | 1 | 0 | 1 | 1 | 0 | 0 | 1 | 0 | 1 |
| 1 | 1 | 0 | 1 | 1 | 0 | 0 | 1 | 0 | 1 |
| 0 | 0 | 0 | 0 | 1 | 1 | 0 | 1 | 0 | 1 |
| 1 | 0 | 0 | 0 | 1 | 1 | 0 | 1 | 0 | 1 |
| 0 | 1 | 0 | 0 | 1 | 1 | 0 | 1 | 0 | 1 |
| 1 | 1 | 0 | 0 | 1 | 1 | 0 | 1 | 0 | 1 |
| 0 | 0 | 0 | 1 | 1 | 0 | 0 | 0 | 1 | 1 |
| 1 | 0 | 0 | 1 | 1 | 0 | 0 | 0 | 1 | 1 |
| 0 | 1 | 0 | 1 | 1 | 0 | 0 | 0 | 1 | 1 |
| 1 | 1 | 0 | 1 | 1 | 0 | 0 | 0 | 1 | 1 |
| 0 | 0 | 0 | 0 | 1 | 1 | 0 | 0 | 1 | 1 |
| 1 | 0 | 0 | 0 | 1 | 1 | 0 | 0 | 1 | 1 |
| 0 | 1 | 0 | 0 | 1 | 1 | 0 | 0 | 1 | 1 |
| 1 | 1 | 0 | 0 | 1 | 1 | 0 | 0 | 1 | 1 |
| 0 | 0 | 0 | 1 | 1 | 0 | 0 | 1 | 1 | 1 |
| 1 | 0 | 0 | 1 | 1 | 0 | 0 | 1 | 1 | 1 |
| 0 | 1 | 0 | 1 | 1 | 0 | 0 | 1 | 1 | 1 |
| 1 | 1 | 0 | 1 | 1 | 0 | 0 | 1 | 1 | 1 |
| 0 | 0 | 0 | 0 | 1 | 1 | 0 | 1 | 1 | 1 |
| 1 | 0 | 0 | 0 | 1 | 1 | 0 | 1 | 1 | 1 |
| 0 | 1 | 0 | 0 | 1 | 1 | 0 | 1 | 1 | 1 |
| 1 | 1 | 0 | 0 | 1 | 1 | 0 | 1 | 1 | 1 |
| addresses other than the foregoing | | | | | | | | | 0 |

What is claimed is:

1. An image information reading apparatus, comprising
   means for reading an optical image,
   a peak hold means, connected to the output of said means for reading an optical image, for storing the peak analog value of the output of said receiving means for a predetermined period of time,
   first and second means responsive to peak hold means for level detecting and converting into a succession of digital outputs the output from said peak hold means at first and second predetermined levels, respectively, that are different from each other,
   means coupled to said second level detecting and converting means for determining the pattern of successive digital outputs obtained by said second level detecting and converting means for providing a selection signal, and
   gate means coupled to said first and second level detecting and converting means and responsive to said selection signal for selectively transmitting the output of either of said first and second level detecting and converting means.

2. An image information reading apparatus in accordance with claim 1, wherein said determining means comprises
   pattern storage means responsive to said second level detecting and converting means for storing the successive digital outputs of said second level detecting and converting means, and
   means for judging the pattern of the successive digit outputs stored in said pattern store means for providing said selection signal determinable as a function of said determination.

3. An image information reading apparatus in accordance with claim 2, which further comprises delay storage means responsive to said first level detecting and converting means for storing the successive digital outputs of said first level detecting and converting means for delaying the successive digital outputs of said first level detecting and converting means for synchronization with the successive digital outputs stored in said pattern storage means.

4. An image information reading apparatus in accordance with claim 3, wherein said delay storage means and said pattern storage means each comprises first and second shift register means, respectively, for shifting said stored successive digital outputs as a function of a clock pulse, each shift register means having a plurality of bit positions.

5. An image information reading apparatus in accordance with claim 4, wherein said gate means is adapted to selectively transmit the successive digital outputs of said first or second level detecting and converting means from the coresonding bit positions of the corresponding one of said first and second shift register means.

6. A signal discriminator apparatus comprising:
a means for receiving an input signal to be discriminated,
a peak hold means, connected to the output of said receiving means, for storing the peak analog value of the output of said receiving means for a predetermined period of time
first and second means responsive to the output of said peak hold means for level detecting and converting into a succession of digital outputs the output of said peak hold means at first and second predetermined levels, respectively, that are different from each other,
means coupled to said second level detecting and converting means for determining the pattern of successive digital outputs obtained by said second level detecting and converting means for providing a selection signal, and
gate means coupled to said first and second level detecting and converting means and responsive to said selection signal for selectively transmitting the output of either of said first and second level detecting and converting means.

7. An image information reading apparatus, comprising means for reading an optical image,
first and second means responsive to said optical image reading means for level detecting and converting into a succession of digital outputs the output from said optical image reading means at first and second predetermined levels, respectively, that are different from each other,
means coupled to said second level detecting and converting means for determining the pattern of successive digital outputs obtained by said second level detecting and converting means for providing a selection signal, and
gate means coupled to said first and second level detecting and converting means and responsive to said selection signal for selectively transmitting the output of either of said first and second level detecting and converting means;
wherein said determining means comprises:
pattern storage means responsive to said second level detecting and converting means for storing the successive digital outputs of said second level detecting and converting means, and
means for judging the pattern of the successive digit outputs stored in said pattern store means for providing said selection signal determinable as a function of said determination;
and which further comprises delay storage means responsive to said first level detecting and converting means for storing the successive digital outputs of said first level detecting and converting means for delaying the successive digital outputs of said first level detecting and converting means for synchronization with the successive digital outputs stored in said pattern storage means;
and wherein said delay storage means and said pattern storage means each comprises first and second shift register means, respectively, for shifting said stored successive digital outputs as a function of a clock pulse, each shift register means having a plurality of bit positions; and wherein said gate means is adapted to selectively transmit the successive digital outputs of said first or second level detecting and converting means from the corresponding bit positions of the corresponding one of said first and second shift register means;
said second shift register means comprising a greater number of bit positions than said first shift register, wherein said second shift register means additionally stores successive digital outputs occurring earlier in time than those stored in said first shift register.

8. An image information reading apparatus in accordance with claim 7, wherein said judging means comprises a read only memory preloaded with a plurality of patterns of said successive digital outputs for providing a selection signal for each of said patterns.

9. A signal discriminator apparatus comprising:
an amplifier for amplifying a signal to be discriminated,
a peak hold circuit connected to said amplifier output for storing the peak value of said amplifier output,
first and second comparator circuits, each having first and second inputs and each having its first input connected to the output of said amplifier,
first and second voltage divider means, connected to the output of said peak hold circuit, with their respective outputs connected to the second inputs of the first and second comparator circuits, wherein said first and second voltage dividers have different voltage division ratios,
first and second shift registers, connected to the respective outputs of said first and second comparators,
a timing signal generator means connected to said first and second shift registers for shifting said registers,
a read only memory connected to the outputs of said first shift register for providing a predetermined logic output in response to said outputs of said first shift register,
a gating circuit, connected to the outputs of both of said shift registers and the read only memory such that one preselected output from either said first or second shift register is outputted by said gating circuit in response to the logic level of said read only memory output.

* * * * *